March 24, 1964   J. J. SPICER, JR   3,126,230
EXTENDIBLE SLIDES
Filed Oct. 3, 1960   2 Sheets-Sheet 2
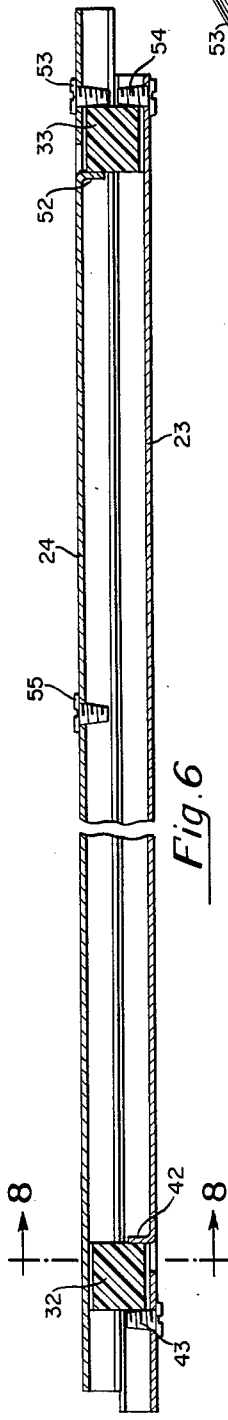
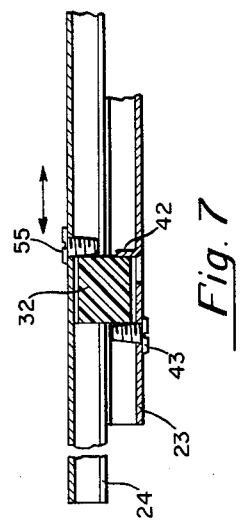
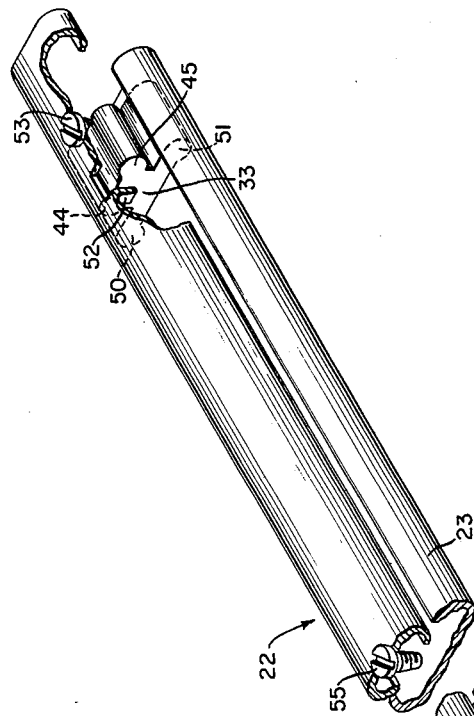
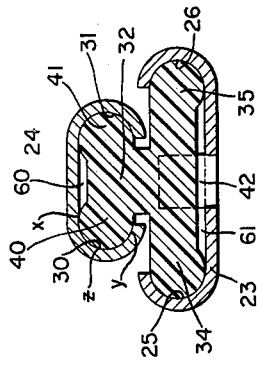
INVENTOR.
John J. Spicer Jr.
BY
Synnestvedt & Lechner

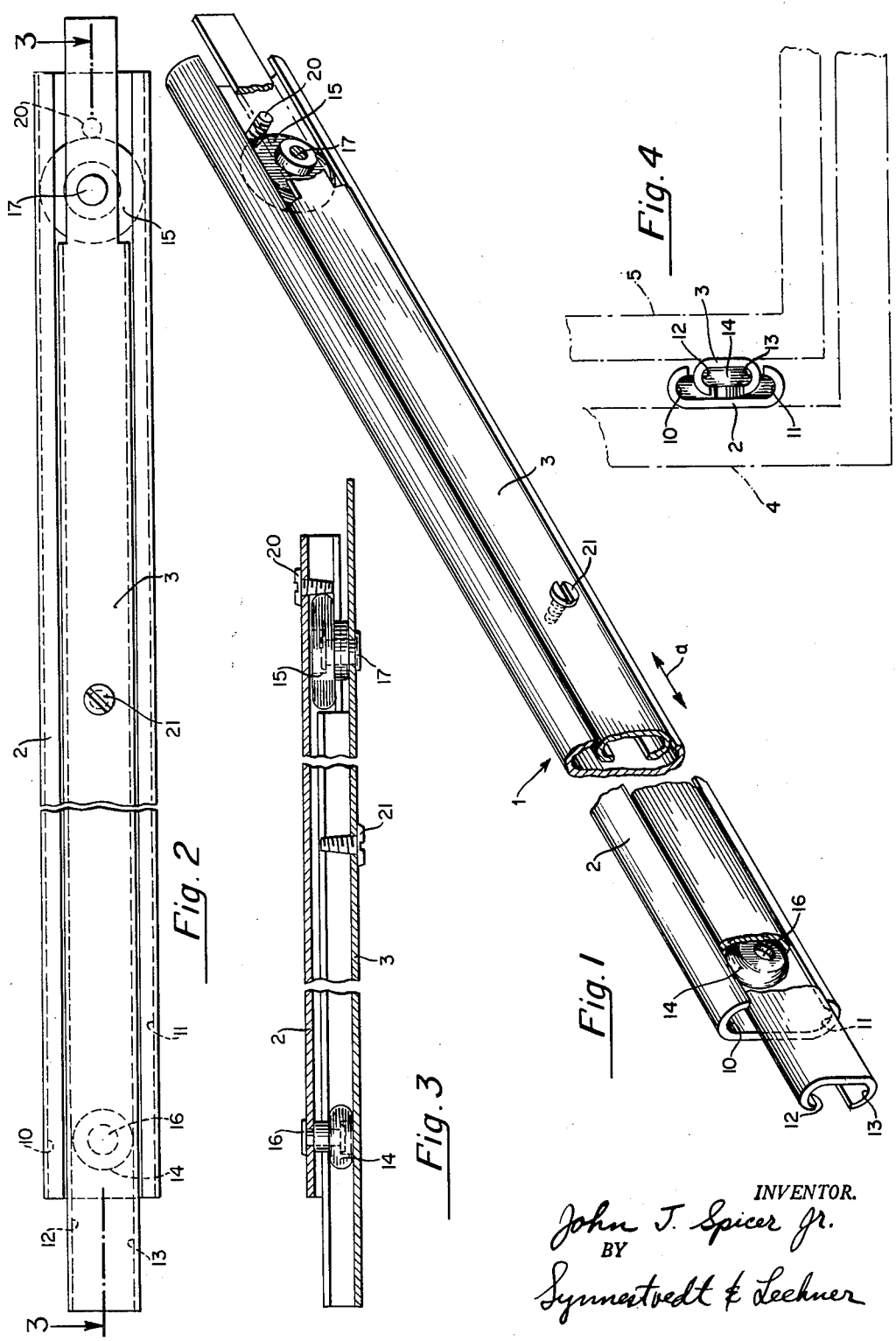

United States Patent Office 3,126,230
Patented Mar. 24, 1964

3,126,230
EXTENDIBLE SLIDES
John J. Spicer, Jr., Philadelphia, Pa., assignor to Novo Industrial Corporation, Philadelphia, Pa., a corporation of Delaware
Filed Oct. 3, 1960, Ser. No. 60,144
2 Claims. (Cl. 308—3.6)

This invention relates to extendible slides.

The invention is particularly concerned with improvements in extendible slides of the type having two relatively movable members, one member being fixed to a frame and the other member being fixed to a drawer or other receptacle, the slide providing for the drawer to be moved outwardly of the frame.

One object of the invention is to provide an extendible slide having a pair of members, each member being formed with a pair of facing channels together with means for connecting the members together and providing for their relative motion, such means including a pair of supports respectively mounted on the members and each support being fixed on its member and movably interengaging with the channels of the other member.

Another object of the invention is to provide an extendible slide having a pair of relatively movable members, each member being formed with a pair of facing channels together with means connecting the members together and providing for said relative motion and a supporting means including a pair of rollers respectively mounted on the members and each roller being fixed on its member and movably interengaging with the channels of the other member.

Another object of the invention is to provide an extendible slide having a pair of relatively movable members, each member being formed with a pair of facing channels and means connecting the members together and providing for said relative motion, such means comprising a pair of supports respectively mounted on the member and each support being fixed on its member and having a pair of shoulders movably engaging the channels of the other member.

Another object of the invention is to provide an extendible slide comprising a pair of relatively movable members each member being formed with a pair of facing channels together with means connecting the members together and providing for such relative motion, such means including a pair of supports respectively mounted on the members and engaging the channels of the other member, the supports providing for the slide to be usable for side or bottom mounting on a drawer.

Another object of the invention is to provide an extendible slide having a pair of relatively movable members, each member being formed with a pair of facing channels and means connecting the members together and providing for said relative motion, such means comprising a pair of supports respectively mounted on the members and each support including a pair of shoulders which engages the channels of the member on which the support is mounted together with an additional pair of shoulders which extends into the channels of the other member and makes a sliding contact therewith.

The manner in which the invention is constructed and certain advantages and features thereof will be apparent from the description below taken in conjunction with the drawings wherein:

FIGURE 1 is an isometric view of an extendible slide constructed in accordance with the invention, the slide being for side mounting;

FIGURE 2 is a side elevational view of the slide of FIGURE 1;

FIGURE 3 is a view taken along the line 3—3 of FIGURE 2;

FIGURE 4 is a view partially in phantom showing a typical side mounting arrangement with the slide of FIGURE 1;

FIGURE 5 is an isometric view of a slide constructed in accordance with the invention and adapted for either side or bottom mounting;

FIGURE 6 is a sectional, elevational view of the slide of FIGURE 5;

FIGURE 7 is a fragmentary view of the slide of FIGURE 8 wherein the members are in extended position; and FIGURE 8 is a view taken along the line 8—8 of FIGURE 6 and showing the cross sectional shape of the support for the slide of FIGURE 5.

The extendible slide 1 shown in FIGURE 1 is in the side mounting position where, for example, the member 2 is attached to a frame and the member 3 is attached to a drawer or other receptacle. This is shown in FIGURE 4 where the dot and dash lines 4 represent the frame and the dot and dash lines 5 represent the drawer. The member 3 is connected to the drawer and the member 2 is connected to the frame. The drawer 5 may be moved relative to the frame in a direction in and out of the plane of the paper.

As will be apparent from an inspection of FIGURES 1 and 4, the members 2 and 3 are each formed with a pair of facing channels. For example, the member 2 is provided with the channels 10 and 11 and the member 3 has the channels 12 and 13.

The members 2 and 3 are connected together by support means which provide for relative motion of the members 2 and 3 in a direction indicated by the arrows A. In the present instance the support means takes the form of a pair of rollers. This is best indicated in FIGURE 3 wherein it will be seen that the support 2 mounts a roller 14, the peripheral edge of which fits snugly into the facing channels 12 and 13 of the member 3. The member 3 has a roller 15 which fits snugly into the channels 10 and 11 of member 2.

Preferably the rollers 14 and 15 are attached to the respective members 2 and 3 by means of rivets 16 and 17 which, while securely mounting the rollers on the members, provide for rotation of the rollers.

With the periphery of the rollers fitting into the facing channels the members 2 and 3 are securely connected together and are free to move along a path of relative motion in a direction indicated by the arrows A.

In FIGURE 1 the members 2 and 3 are shown in the closed position. For determining the relative locations of the members 2 and 3 in the closed position I have provided a stop means 20 which is mounted on the member 2 and projects into the path of relative motion so as to be engageable by the roller 15.

When the two members are moved to open position, that is to say, the member 3 is moved to the left relative to the member 2, the relative location of the members in open position is determined by the stop means 21 which is mounted on the member 3 and projects into the path of relative motion so as to be engageable with the roller 14.

The stop members 20 and 21 are shown in the form of metal screws but may be in other form, for example punched lips.

It will be observed that the members 2 and 3 have the same cross sectional shape but are of different size, the member 2 being larger than the member 3. Also, it will be noted that the roller 14 is somewhat smaller than the roller 15. With this construction the member 3 can be nested within the member 2 as shown in FIGURE 4. This construction is desirable where it is important to reduce the overall width of the slide. In those instances where width dimension is not critical, the rollers may be of the same size. The rollers are made of molded nylon in those applications where quietness is desired. However, the roller may be of metal, for example in those applications where the slide is subject to high temperature, such as when supporting a drawer in an oven.

When the slide of FIGURE 1 is extended, i.e., member 3 moved to the left, the roller 14 remains fixed in position with the member 2 while the roller 15 moves along with the member 3.

From the foregoing it will be apparent that the extendible slide of FIGURE 1 is made of parts that can be quickly manufactured by conventional methods. For example, the members 1 and 2 can be made from strip continuously rolled on the mill and then cut off to size. The rivets 16 and 17 used for attaching the rollers 14 and 15 are of commercial size and provide for a very quick and easy means for assembling the rollers to the members 2 and 3. The stop members 20 and 21 are metal screws which are very quickly and easily assembled to the members 2 and 3. While the structure does not provide a slide having maximum extendibility as compared to a slide having a movable interconnecting carriage, the structure finds wide utility in those applications where maximum extendibility is not important. Furthermore, the construction provides a slide which is rugged, durable and very low in cost.

In FIGURE 5 I have shown a slide 22 which is constructed for use either in side or bottom mounting. For example, in FIGURE 5 the extendible slide 22 has members 23 and 24 with the member 23 being mounted on the frame and the member 24 being mounted on the bottom of the drawer or other receptacle. For side mounting the slide is simply turned 90° from the position shown in FIGURE 5 and the member 23 is connected to the frame and the member 24 connected to the side of the drawer.

In FIGURE 5 the member 23 is provided with a pair of facing channels 25 and 26 and the member 2 is provided with the facing channels 30 and 31.

For connecting the members 23 and 24 together and providing for their relative motion in a direction indicated by the arrows B the invention contemplates a pair of identical supports 32 and 33 the cross sectional shape of which is indicated in FIGURE 8.

The support 32 has a pair of shoulders 34 and 35 which fit into the facing channels 25 and 26. Further, the support has shoulders 40 and 41 which fit into the channels 30 and 31 of member 24. The support 32 is fixed on the member 23 by means of the punched lip 42 and the metal screw 43.

The support 33 is similarly configured, having shoulders 44 and 45 fitting snugly into the channels 30 and 31 together with shoulders 50 and 51 which fit snugly into the channels 25 and 26 of the member 23. The support 33 is fixed with respect to the member 23 by way of the punched lip 52 and metal screw 53 both disposed on the member 24.

In the bottom mounting position of the slide in FIGURE 5 it will be observed that the shoulders 40 and 41 operating in the channels 30 and 31, together with the shoulders 34 and 35 operating in the channels 25 and 26, provide for the sliding movement of the member 24 relative to the member 23, the support 32 remaining fixed in member 23 while the support 33 moves along with the member 24. The particular bearing areas between the shoulders and channels which operate for the supporting and sliding functions depend on the position of the member 24 with respect to the member 23 and on the load distribution.

Where the slide is turned 90° for side mounting it will be seen that the shoulders and channels mentioned above cooperate to provide for the movement of member 24 relative to member 23 except that different bearing areas on the shoulders and channels come into play depending upon the position of the member 24 and the load distribution.

With regard to the bearing surfaces between the shoulders and channels, it is important to note that the degree of contact or degree of possible contact between a shoulder and channel extends over about 180° as will be apparent from an inspection of FIGURE 8. In any event, there should be at least two bearing areas or surfaces spaced about 180° apart, for example $x$ and $y$ together with a bearing surface about midway between such as indicated at $z$.

As seen in FIGURE 6, the stop member 54 (which is a metal screw) is connected to the member 23 and extends into the path of relative motion being adapted to be engaged by the support 33 to define the closed position of the slide. The metal screw 55 on the member 24 extends into the path of relative motion and is adapted to engage the support 32 to define the extended position of the slide (see FIGURE 7).

With reference to FIGURE 8 it will be noted that the support 32 is cut away at the area indicated at 60 and 61 which keeps the body of the support away from the members and reduces the sliding friction. The support 33 is similarly configured.

In the above description it has been assumed that the small members of the slides 1 and 22 were connected to the drawer or other receptacle and the larger members fixed to the frame or housing. This has been done purely for illustration purposes as it will be understood by those skilled in the art that the position of the members can be reversed; i.e., with the larger members (2 and 23) secured to the drawer and the smaller members (3 and 24) fixed to the frame or housing.

I claim:

1. An extendible slide comprising: a first elongated member formed with a pair of facing channels; a second elongated member formed with a pair of facing channels; a support adjacent one end of said first member and mounted to be movable with the first member if the same is moved but non-rotatable with respect to the first member, the support having a pair of shoulders extending into the channels of the first member and a pair of shoulders extending into and making sliding contact with the channels of said second member, the support connecting the two members together and providing for relative motion of the members along an axis; and a second support of the same cross sectional shape as the first said support, the second support being disposed adjacent one end of said second member and mounted to be movable with the second member if the same is moved but non-rotatable with respect to the second member, the second support having a pair of shoulders extending into the facing channels of said second member and a pair of shoulders extending into and making sliding contact with the channels of said first member, the second support connecting the two members together and providing for relative motion of the members along said axis.

2. A construction in accordance with claim 1 wherein each said support is connected to its member by a lip extending outwardly from the member and bearing on one side of the support together with a screw connected with and extending outwardly of the member and bearing on the opposite side of the support.

References Cited in the file of this patent

UNITED STATES PATENTS

| 2,733,972 | Diack | Feb. 7, 1956 |
| 2,871,085 | Diack | Jan. 27, 1959 |
| 2,964,093 | Lohr et al. | Dec. 13, 1960 |
| 3,013,763 | Weberman | Dec. 19, 1961 |